United States Patent [19]

Wu

[11] Patent Number: 4,466,244
[45] Date of Patent: Aug. 21, 1984

[54] POWER GENERATION

[76] Inventor: Jiun-tsong Wu, 446 Manzanita Ave., Sierra Madre, Calif. 91024

[21] Appl. No.: 411,504

[22] Filed: Aug. 25, 1982

[51] Int. Cl.³ ............................................. F03B 13/12
[52] U.S. Cl. ......................................... 60/398; 60/497; 417/100
[58] Field of Search .................. 417/100; 60/398, 497

[56] References Cited

U.S. PATENT DOCUMENTS 4,098,081 7/1978 Woodman ........................ 60/497 X
4,271,668 6/1981 McCormick ..................... 60/497 X Primary Examiner—Allen M. Ostrager

[57] ABSTRACT

A collection device for energy from water with wave motion has working fluids, a number of pumping units and accumulators interconnected together, and valves to regulate the fluid flow. Each pumping unit has a chamber with an intake port connected to an accumulator, an exhaust port connected to another accumulator, and an outlet to the water. The working fluid in the chamber is in contact with the water, or is partitioned from the water by a flexible membrane or a piston. The pressure from the wave motion of the water pumps the working fluid from one accumulator to another with certain pressure or elevation increase. The working fluid gains suitable pressure or elevation increase through several stages of pumping units.

4 Claims, 12 Drawing Figures

POWER GENERATION

The wave motion of water in nature contains energy. This energy from undulating water can be collected and utilized with suitable method. It is an object of this invention to disclose a device for collecting such energy. The invention is applicable to electric power generation from ocean, lake, river, or other water occuring in nature.

In this invention, the energy collection device uses a working fluid, or fluids, as a medium or media for transmitting pressure and storing energy. The working fluid is pumped from a state of lower energy to a state of higher energy by the wave motion of the water. The fluid is either a liquid or a gas. During the process, the gas is compressed to a higher pressure, or the liquid is lifted to a higher elevation by the action of the undulating water. The working fluid can then be used to drive a turbine, a hydraulic motor, or other energy conversion machine. Alternatively, the device can be used for the purpose of compressing gases or transporting liquids.

The energy collection device is supported by a structure fixed to the earth, or a float, or a ship. The device consists of several pumping units and accumulators interconnected together. Each unit is able to pump the working fluid with certain increase of energy in the form of elevation and pressure. Due to the limited amplitude of the wave motion, the increase of fluid elevation and pressure in one pumping stage is usually too small to be of practical use. The working fluid is therefore pumped through several pumping units and accumulators in succession to gain the desirable pressure for the gas, or the desirable elevation for the liquid.

The working fluid used may be a gas, such as the air, or certain kind of liquid which is preferably insoluble in water. One of the functions of the working fluid is to store energy. If the working fluid which stores energy is a liquid, reservoirs are used as the accumulators. The accumulator is a storage tank which is preferably vented to the atmosphere and is capable of holding the liquid at certain elevation. If the working fluid which stores energy is a gas, gas containers are used as the accumulators. The accumulator is a storage tank capable of holding the working fluid under certain steady pressure.

The pumping unit has a chamber which is connected with the accumulators and also subjected to pressure variation from the undulating water. The chamber has an intake port and an exhaust port. The two ports may also be combined into one for both intake and exhaust functions. The port or ports are connected to the accumulators. The chamber has an outlet to the undulating water. The space formed by the chamber and the outlet is partially filled with the working fluid and partially filled with the water. The outlet transmits the hydraulic pressure of the water to the chamber. For proper confinement of the working fluid, the fluid should remain separated from the water. Three forms of this invention will be described according to the methods of confining the working fluid. In the first form, the working fluid is allowed to be in direct contact with the water. The separation of the working fluid from the water is effected by their difference of densities and their mutual insolubility. The undulating water in this invention acts like a piston which pumps and seals the working fluid in the chamber. In the second form, the working fluid is partitioned from the water with a flexible membrane. The membrane transmits the hydraulic pressure. The separation of the working fluid from the water is effected by the difference of their densities and the impermeability of the membrane. In the third form, the working fluid is partitioned from the water by a piston sliding in a cylindrical wall. In all three forms, the fluid in the chamber is subjected to the hydraulic pressure of the water wave with minimal mechanical means. It is an object of this invention to disclose a pumping mechanism that is efficient and easy to build by allowing the water pressure to act on the working fluid as directly as possible.

The pumping units and the accumulators are interconnected through conduits. Valves are provided in the interconnections to regulate the flows of the working fluid so that it is pumped in the direction of increasing elevation or pressure. The valve is a check valve that operates on pressure difference and allows the fluid to flow in one direction only. Each pumping unit is connected to two accumulators, one as a supplier and the other as a receiver of the working fluid. The accumulator on the receiving side has a higher pressure or elevation than the accumulator on the supplying side. Each accumulator, except the first and the last ones, is connected to two pumping units and serves as a supplier of working fluid for one pumping unit and as a receiver for the other pumping unit. The last accumulator is connected to only one pumping unit and serves as the final storage place before the working fluid is utilized. It is preferably larger in size than other accumulators. The first accumulator is also connected to only one pumping unit and preferably larger in size. A turbine is connected between the last and the first accumulators to generate mechanical power. If the air is used as the working fluid, the first accumulator may be omitted entirely. The first pumping unit is then allowed to receive the air from the atmosphere through a check valve on the intake side, and the turbine discharges the air directly into the atmosphere. The directions of the check valves are chosen so that the fluid can flow from the accumulator on the supply side to the pumping chamber, and from the pumping chamber to the accumulator on the receiving side. Fluid flow in the reversed direction is prevented.

The elevations of the liquid or the pressures of the gas vary from one accumulator to another. As the fluid is pumped successively, the elevation or the pressure is gradually increased. For a collection device of this invention to work, it is necessary to allow the pumping chambers to maintain pressures and elevations that are compatible with the interconnected accumulators and at the same time be subjected to the pressure variations from the wave motion of the water. This is achieved by utilizing the gravitational forces acting on the fluid and the water. It is a fact that when two insoluble fluids of different densities are confined in a chamber, they are separated from each other by gravity. The lighter fluid stay on top of the heavier fluid. Furthermore, within one fluid in a container, the difference of hydrostatic pressure between two points is equal to the product of the fluid density, the gravitational acceleration, and the elevation difference between the two points. The sum of the pressure and the product of density, gravitational acceleration, elevation is a constant at any point of the fluid and is equivalent to the fluid energy density. These two facts of hydrostatics are caused by the gravitation forces acting on the fluid or the fluids. They will be utilized to maintain the necessary pressure and elevation bias of the pumping chambers, and to confine and seal the working fluid in the proper place. The elevations of the liquid accumulators, the pressures of the gas accumulators, the elevations of the pumping chambers, the elevations of the outlet openings, and the elevations of the fluid boundaries are all chosen with consideration of these two facts. It is still another object of this invention to utilize the gravitation forces acting on the working fluid and on the undulating water to maintain proper pressure and elevation bias for the pumping chambers, and to confine and seal the working fluid in the proper place in the collection device.

Since the pumping chamber is subjected to the pressure from the wave motion of the water, the pressure at certain point inside the chamber of the pumping unit varies with time. The result of this variation, combined with the regulations provided by the valves, is a pumping action. It allows the working fluid to enter the chamber when the chamber pressure drops below certain level and is overcome by the pressure in the accumulator on the supply side. It also allows the working fluid to leave the chamber when the chamber pressure increases and overcomes the pressure in the accumulator on the receiving side. Each pumping unit is thus capable of pumping the working fluid from the supplying accumulator to the receiving accumulator with certain pressure increase. Its operation is very similar to an ordinary reciprocal pump with piston and cylinder. The chamber serves as the cylinder and the water as the piston.

The pressure increase by a single pumping unit is limited by the amplitude of the water wave. When the pumping units and the accumulators are connected together in a chain, they form a pumping system which produces a total pressure difference for the working fluid greater than a single pumping unit is capable of.

The first form of this invention is desclosed as follows:

Due to the number of working fluids used and the difference of their densities, different embodiments of this invention can be made. Six prefered embodiments of the first form will be described. Each of the first and the second embodiments uses one working fluid. Each of the third through the sixth embodiments uses two working fluids, henceforth called the primary and the secondary fluids. The primary fluid is used to store the energy. The secondary fluid is confined between the primary fluid and the undulating water and is used to transmit pressure and maintain proper pressure bias in the pumping chamber. The first embodiment uses a working fluid of density lower than that of the water. The second embodiment uses a working fluid of density higher than that of the water. The third embodiment uses a secondary working fluid with a density higher than that of the primary fluid, but lower than that of the water. The fourth embodiment uses a secondary working fluid with a density higher than that of the primary fluid, and also higher than that of the water. The fifth embodiment uses a secondary working fluid with a density lower than that of the primary fluid, and also lower than that of the water. The sixth embodiment uses a secondary working fluid with a density lower than that of the primary fluid but higher than that of the water. In the first and the second embodiments, the chamber and the outlet are combined together to form a drum shape space with an opening. In the third through the sixth embodiments, the outlet extends from the chamber to reach certain depth in the water. To ensure the working fluid stays inside the device, it is preferable to have the opening of the outlet face up if the secondary fluid is denser than the water, and face down if the secondary fluid is lighter than the water.

DETAILED DESCRIPTION OF THE DRAWINGS

Figure 1:
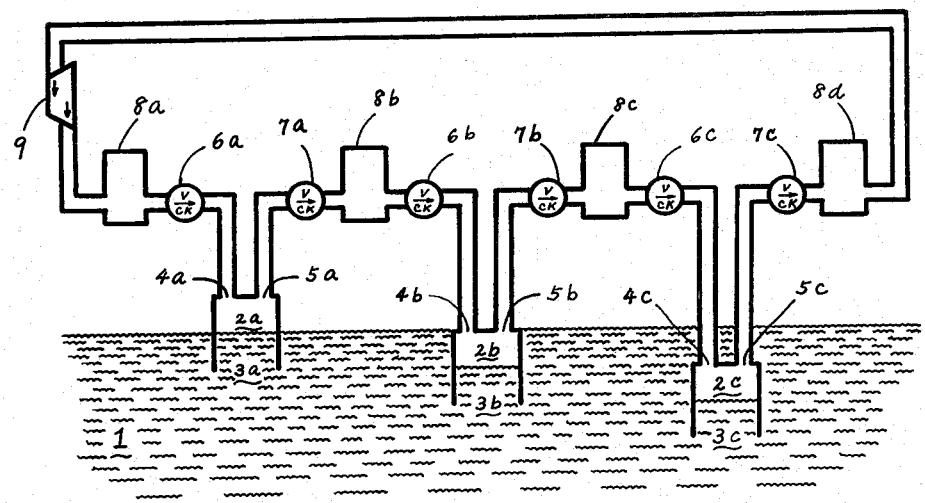
FIG. 1 shows a power generation system utilizing a gas as the working fluid.

FIG. 1 illustrates the first embodiment. The device collects energy from the wave motion of a body of water 1. A gas is used as the working fluid. There are three stages of pumping units. Three pumping chambers 2a, 2b, and 2c are immersed in the water at various depths. The pumping chambers have outlets 3a, 3b, and 3c that face down to ensure proper confinement of the working fluid. Three intake ports 4a, 4b, 4c and three exhaust ports 5a, 5b, 5c are located in the upper parts of the chambers. The spaces formed by the chambers and the outlets are partially filled with the working fluid, and partially filled with the water. The working fluid is above the water. The boundary between the water and the working fluid varies because of the action of the wave motion of the water. The ports are connected to accumulators 8a, 8b, 8c, and 8d. Three check valves 6a, 6b, 6c are interposed between the intake ports and the accumulators. Three check valves 7a, 7b, 7c are interposed between the exhaust ports and the accumulators. A turbine 9 is connected between 8d and 8a to produce mechanical power from the gas pressure.

The device operates as follows: The first pumping unit is only partially immersed in the water with the top of the chamber 2a above the water and its outlet 3a below the water surface. When the wave motion of the water causes the pressure inside the chamber to drop, the working fluid from the accumulator 8a flows into the chamber. When the pressure in the chamber increases sufficiently later, the working fluid is expelled through the exhaust port to the next accumulator 8b. The second pumping chamber 2b is located slightly deeper in the water, since a greater pressure bias is needed. It pumps the working fluid from the accumulator 8b to the accumulator 8c with another step of increase in pressure. The last pumping chamber 2c pumps the working fluid from the accumulator 8c to the last accumulator 8d with the final step of increase in pressure. The last accumulator 8d also serves as a storage tank for the fluid before it is finally utilized.

Figure 2:
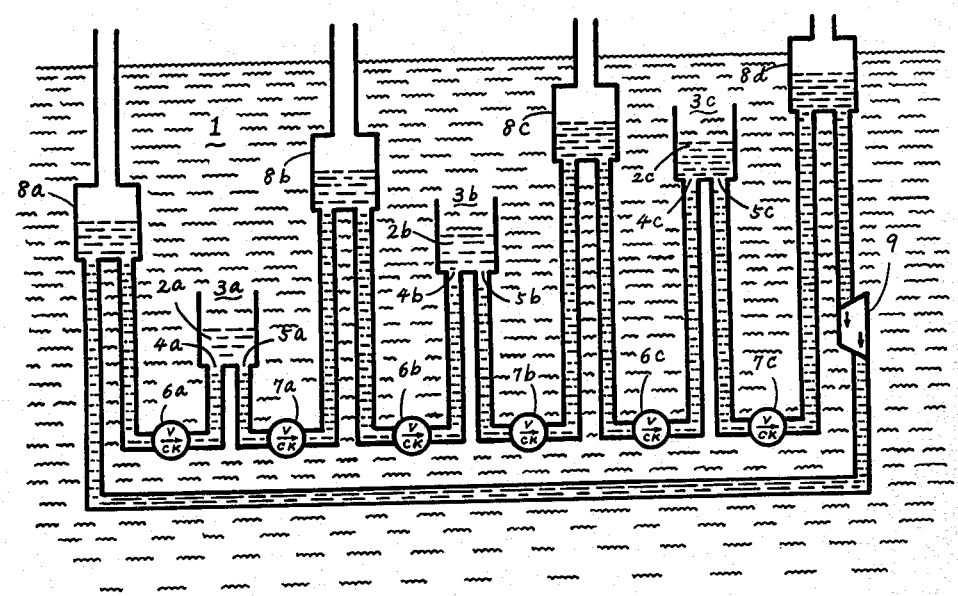
FIG. 2 shows a power generation system utilizing a liquid heavier than water as the working fluid.

FIG. 2 illustrates the second embodiment. The device collects energy from the wave motion of a body of water 1. A liquid heavier than the water is used as the working fluid. There are three stages of pumping units. Three pumping chambers 2a, 2b, and 2c are immersed under the water at various depths. The pumping chambers have outlets 3a, 3b, and 3c that face up to ensure proper confinement of the working fluid. Three intake ports 4a, 4b, 4c and three exhaust ports 5a, 5b, 5c are located in the lower parts of the chambers. The spaces formed by the chambers and the outlets are partially filled with the working fluid, and partially filled with the water. The working fluid is below the water. The boundary between the water and the working fluid varies because of the action of the wave motion of the water. The ports are connected to accumulators 8a, 8b, 8c, and 8d. Three check valves 6a, 6b, 6c are interposed between the intake ports and the accumulators. Three check valves 7a, 7b, 7c are interposed between the exhaust ports and the accumulators. A turbine 9 is connected between accumulators 8d and 8a to produce mechanical power from the fluid pressure.

The device operates as follows: The first pumping chamber 2a is deeply immersed in the water with its outlet 3a below the water surface. When the wave motion of the water causes the pressure inside the chamber to drop, the working fluid from the accumulator 8a flows into the chamber. When the pressure in the chamber increases sufficiently later, the working fluid is expelled through the exhaust port to the next accumulator 8b. The second pumping chamber 2b is located less deeply in the water since the average elevation of the interconnected accumulators is higher. It pumps the working fluid from the accumulator 8b to the accumulator 8c with another step of increase in elevation. The last pumping chamber 2c pumps the working fluid from the accumulator 8c to the last accumulator 8d with the final step of increase in elevation. The last accumulator 8d also serves as a storage tank for the fluid before it is finally utilized.

Figure 3:
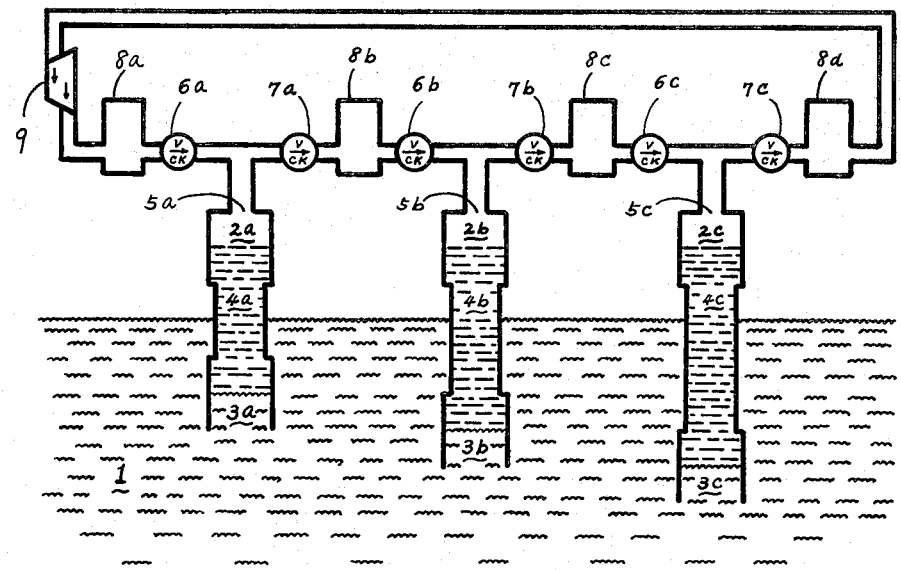
FIG. 3 shows a power generation system utilizing a gas as the primary working fluid and a liquid lighter than water as the secondary working fluid.

FIG. 3 illustrates the third embodiment. The device collects energy from the wave motion of a body of water 1. A gas is used as the primary working fluid, and a liquid lighter than the water is used as the secondary working fluid. There are three stages of pumping units. Three pumping chambers 2a, 2b, and 2c are supported above the water. The pumping chambers have outlets 3a, 3b, and 3c that extend below the water surface to various depths. The openings of the outlets face down to ensure proper confinement of the working fluid 4a, 4b, 4c. Three ports 5a, 5b, 5c are located in the upper parts of the chambers and serve both intake and exhaust functions. The chambers are partially filled with the working liquid, and partially filled with the gas. The working liquid is below the gas. The extended outlets are partially filled with the working liquid and partially filled with the water. The working liquid is above the water. The boundaries between the water and the working fluid and between the gas and the liquid vary due to the action of the wave motion of the water. The ports are connected to accumulators 8a, 8b, 8c, and 8d. Three intake check valves 6a, 6b, 6c and three exhaust check valves 7a, 7b, 7c are interposed between the ports and the accumulators. A turbine 9 is connected between 8d and 8a to convert the gas pressure into mechanical power.

Figure 4:
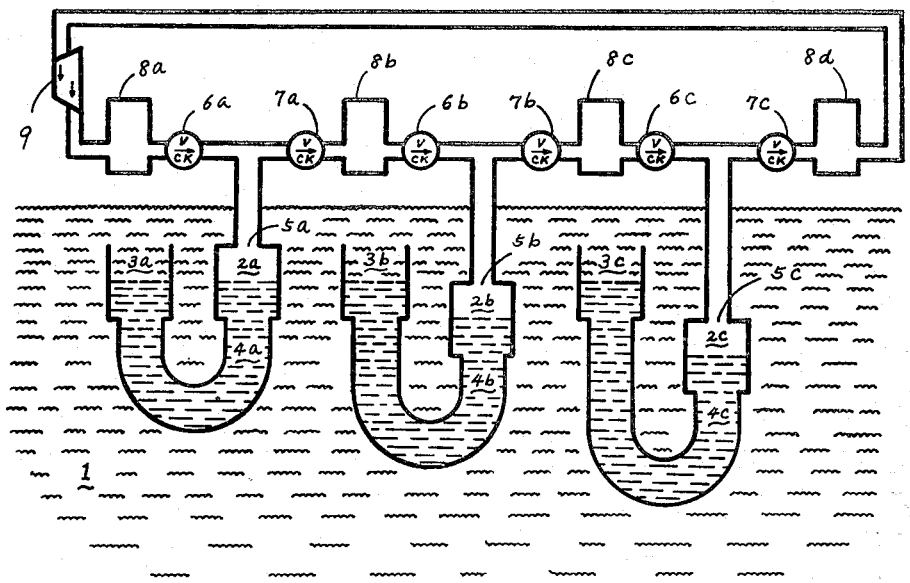
FIG. 4 shows a power generation system utilizing a gas as the primary working fluid and a liquid heavier than water as the secondary working fluid.

FIG. 4 illustrates the fourth embodiment. The device collects energy from the wave motion of a body of water 1. A gas is used as the primary working fluid, and a liquid heavier than water is used as the secondary working fluid. There are three stages of pumping units. Three pumping chambers 2a, 2b, and 2c are supported below the water level. The pumping chambers have outlets 3a, 3b, and 3c that extend downward and then bend upward to reach some depth below the water surface. The openings of the outlets face upward to ensure proper confinement of the working fluid 4a, 4b, 4c. Three ports 5a, 5b, 5c are located in the upper parts of the chambers and serve both intake and exhaust functions. The chambers are partially filled with the working liquid, and partially filled with the gas. The working liquid is below the gas. The extended outlets are partially filled with the working liquid and partially filled with the water. The working liquid is below the water. The boundaries between the water and the working liquid and between the gas and the liquid vary due to the action of the wave motion of the water. The ports are connected to pressure accumulators 8a, 8b, 8c, and 8d. Three intake check valves 6a, 6b, 6c and three exhaust check valves 7a, 7b, 7c are interposed between the ports and the accumulators. A turbine 9 is connected between 8d and 8a to convert the gas pressure into mechanical power.

Figure 5:
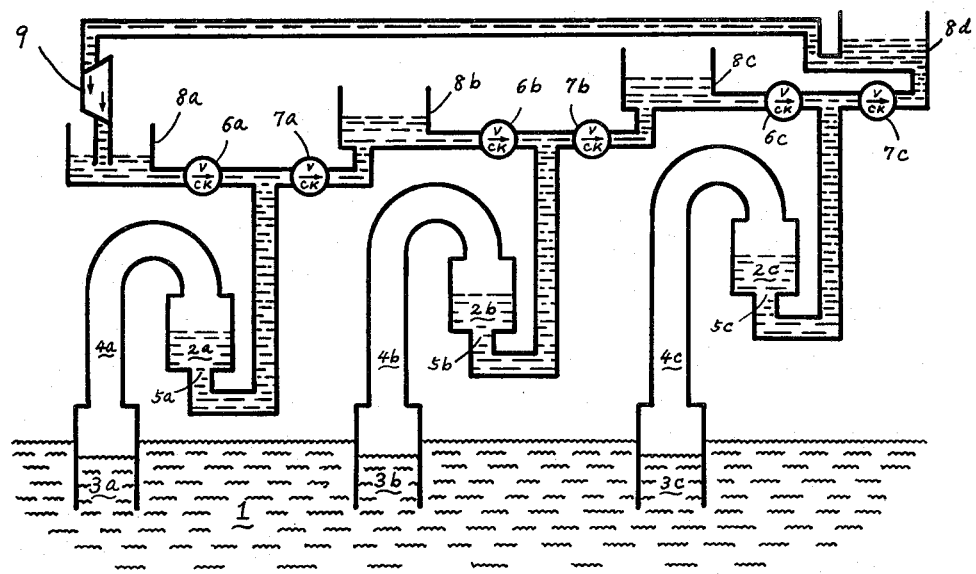
FIG. 5 shows a power generation system utilizing a liquid as the primary working fluid and a gas as the secondary working fluid.

FIG. 5 illustrates the fifth embodiment. The device collects energy from the wave motion of a body of water 1. A liquid is used as the primary working fluid, and a gas is used as the secondary working fluid. There are three stages of pumping units. Three pumping chambers 2a, 2b, and 2c are supported above the water at various elevations. The pumping chambers have outlets 3a, 3b, and 3c that extend upward and then bend downward to reach the water. The openings of the outlets face down to ensure proper confinement of the gas 4a, 4b, 4c. Three ports 5a, 5b, 5c are located in the lower parts of the chambers and serve both intake and exhaust functions. The chambers are partially filled with the gas, and partially filled with the working liquid. The gas is above the working liquid. The extended outlets are partially filled with the gas and partially filled with the water. The gas is above the water. The boundaries between the water and the gas and between the working liquid and the gas vary due to the action of the wave motion of the water. The ports are connected to accumulators 8a, 8b, 8c, and 8d. Three intake check valves 6a, 6b, 6c and three exhaust check valves 7a, 7b, 7c are interposed between the ports and the accumulators. A turbine 9 is connected between 8d and 8a to convert the fluid pressure into mechanical power.

Figure 6:
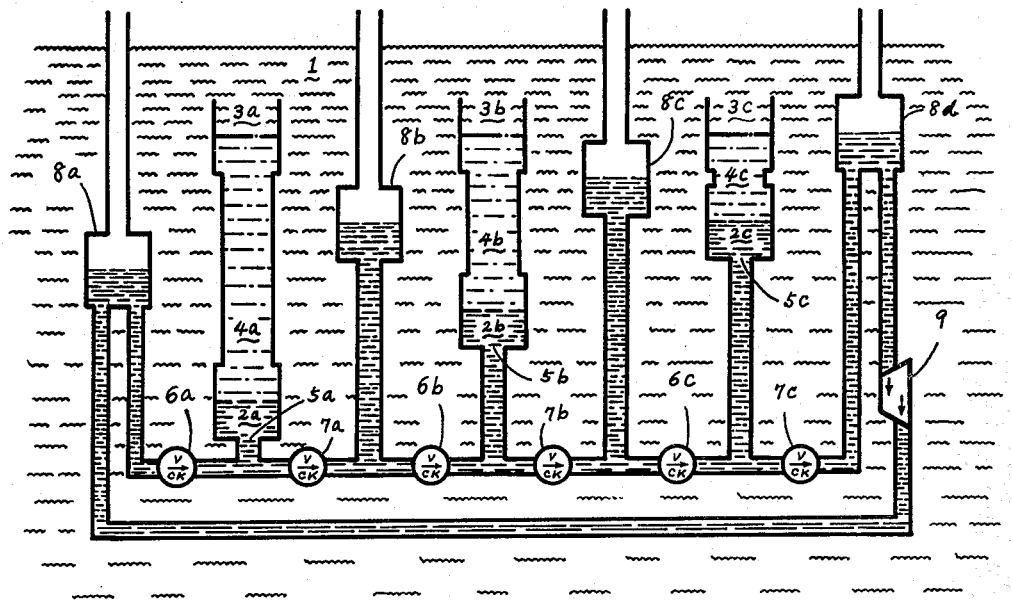
FIG. 6 shows a power generation system utilizing a heavy liquid as the primary working fluid and a liquid heavier than water but lighter than the primary working fluid as the secondary fluid.

FIG. 6 illustrates the sixth embodiment. The device collects energy from the wave motion of a body of water 1. A heavy liquid is used as the primary working fluid, and a liquid heavier than water but lighter than the primary working fluid is used as the secondary working fluid. There are three stages of pumping units. Three pumping chambers 2a, 2b, and 2c are supported below the water at various depths. The pumping chambers have outlets 3a, 3b, and 3c that extend upward to some depth below the water surface. The openings of the outlets face up to ensure proper confinement of the working fluid 4a, 4b, 4c. Three ports 5a, 5b, 5c are located in the lower parts of the chambers and serve both intake and exhaust functions. The chambers are partially filled with the secondary working liquid, and partially filled with the primary working fluid. The secondary working fluid is above the primary working fluid. The extended outlets are partially filled with the secondary working fluid and partially filled with the water. The secondary working fluid is below the water. The boundaries between the water and the secondary working fluid and between the primary working fluid and the secondary fluid vary due to the action of the wave motion of the water. The ports are connected to accumulators 8a, 8b, 8c, and 8d. Three intake check valves 6a, 6b, 6c and three exhaust check valves 7a, 7b, 7c are interposed between the ports and the accumulators. A turbine 9 is connected between 8d and 8a to generate mechanical power.

The mode of operation of embodiments three through six is as follows: The wave motion of the water acts on the secondary fluid which in turn acts on the primary fluid. The primary fluid is pumped from one accumulator to another in a similar way as in the first embodiment. The purpose of extending the outlets and introducing the secondary fluid is to provide certain elevation and pressure bias for the pumping chambers.

Figure 7:
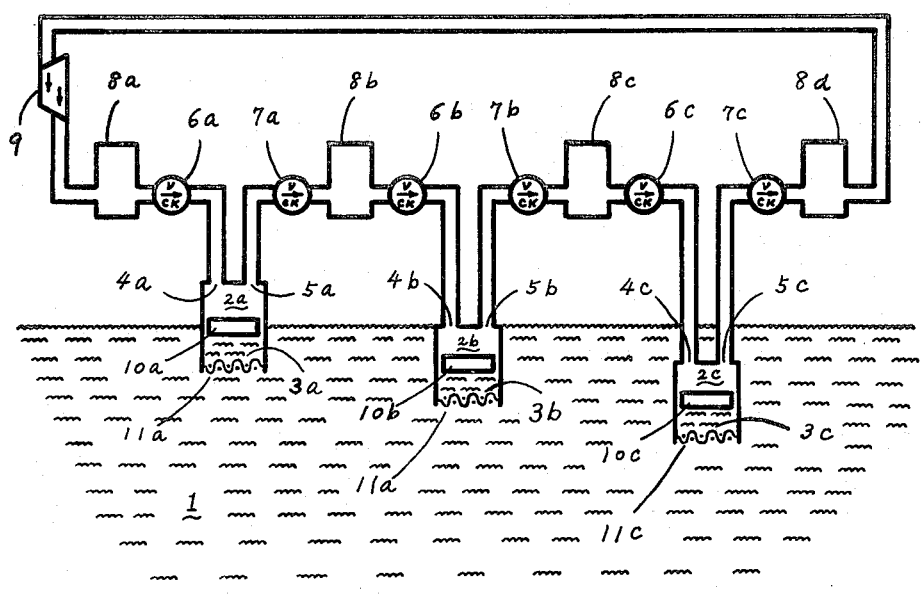
FIG. 7 shows a power generation system which incorporates floats and screens in the pumping units.

FIG. 7 illustrates an embodiment in the first form which further incorporates floats and screens in the pumping units. The construction of the device is similar to that in the first embodiment. The device collects energy from the wave motion of a body of water 1. A gas is used as the working fluid. Three pumping chambers 2a, 2b, 2c have outlets 3a, 3b, 3c, intake ports 4a, 4b, 4c and exhaust ports 5a, 5b, 5c. The ports are connected to accumulators 8a, 8b, 8c, 8d through intake valves 6a, 6b, 6c and exhaust valves 7a, 7b, 7c. A turbine 9 is connected between 8d and 8a. In addition, floats 10a, 10b, 10c are provided in the pumping units to minimize the sloshing of the water. And screens 11a, 11b, 11c are introduced to cover the openings of the outlets. The screens prevent unwanted objects from entering the device.

The second form of the invention is similar to the first form but it further incorporates a flexible membrance in each pumping unit.

Figure 8:
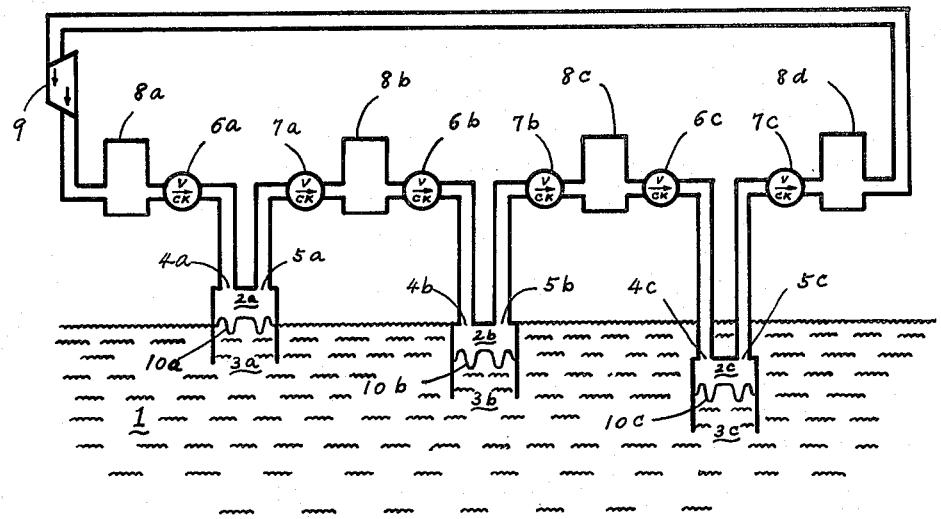
FIG. 8 shows a power generation system which incorporates a flexible membrance in each pumping unit.

FIG. 8 illustrates an embodiment of the device in this form. The construction of the device is similar to that in the first embodiment shown in FIG. 1. The device collects energy from the wave motion of a body of water 1. A gas is used as the working fluid. Three pumping chambers 2a, 2b, 2c have outlets 3a, 3b, 3c, intake ports 4a, 4b, 4c and exhaust ports 5a, 5b, 5c. The ports are connected to accumulators 8a, 8b, 8c, 8d through intake valves 6a, 6b, 6c and exhaust valves 7a, 7b, 7c. A turbine 9 is connected between 8d and 8a. In addition, flexible membrances 10a, 10b, 10c are introduced in the pumping units. The membrance partitions the water and the working fluid. It minimizes the sloshing of the water in the chamber. It also prevents the intermixing of the water and the working fluid while allowing the pressure to be transmitted. In case the water level drops excessively, the membrances prevent the loss of the working fluid.

The third form of the invention is similar to the first form but it further incorporates a piston sliding in each pumping unit.

Figure 9:
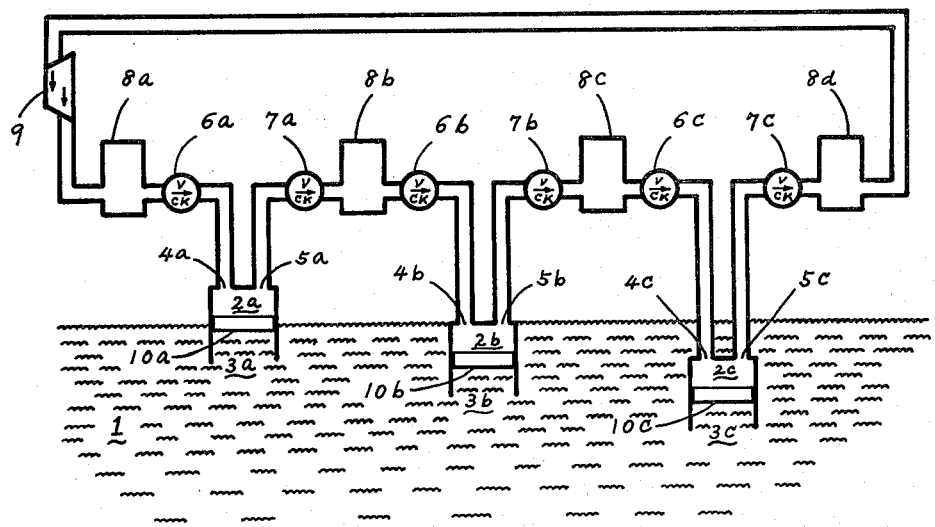
FIG. 9 shows a power generation system which incorporates a piston in each pumping unit.

FIG. 9 illustrates an embodiment in this form. The construction of the device is similar to that in the first embodiment shown in FIG. 1. The device collects energy from the wave motion of a body of water 1. A gas is used as the working fluid. Three pumping chambers 2a, 2b, 2c have outlets 3a, 3b, 3c, intake ports 4a, 4b, 4c and exhaust ports 5a, 5b, 5c. The ports are connected to accumulators 8a, 8b, 8c, 8d through intake valves 6a, 6b, 6c and exhaust valves 7a, 7b, 7c. A turbine 9 is connected between 8d and 8a. In addition, pistons 10a, 10b, and 10c are provided in the chamber. The piston is interposed between the water and the working fluid. The piston slides in a cylindrical wall and transmits the water pressure.

An improvement of the collection device is possible by a more efficient control of the fluid flows. In this improvement, the pumping units and the accumulators are similar to those in the preceeding disclosure but a modification is made in their interconnections. With the embodiments disclosed earlier, the pumping action is possible only when the pressure in the chamber is sufficiently low as compared to the pressure in the accumulator on the supply side, or when the pressure in the chamber is sufficiently high as compared to the pressure in the accumulator on the receiving side. A pressure variation in between the two limits will not cause the pumping to take place. As a result, some energy in the water waves is wasted. In this improvement, a pumping unit is connected to three or more accumulators at various elevations and pressures through a manifold. Valves are provided in the manifold. A computing device is incorporated. This computing device may be analog, digital, electronic, or hydraulic in nature. The computing device has sensors that measure the accumulator pressures, the accumulator fluid levels, the pumping unit pressures, and the water levels inside and outside the pumping units. With the sensor data as input, the computing device computes the optimal timing of the opening and closing of the valves in the manifold. It then outputs commands to control the valves. Higher efficiency of the pumping device is possible with this improvement. This improvement applies to all three forms of the invention disclosed earlier.

Figure 10:
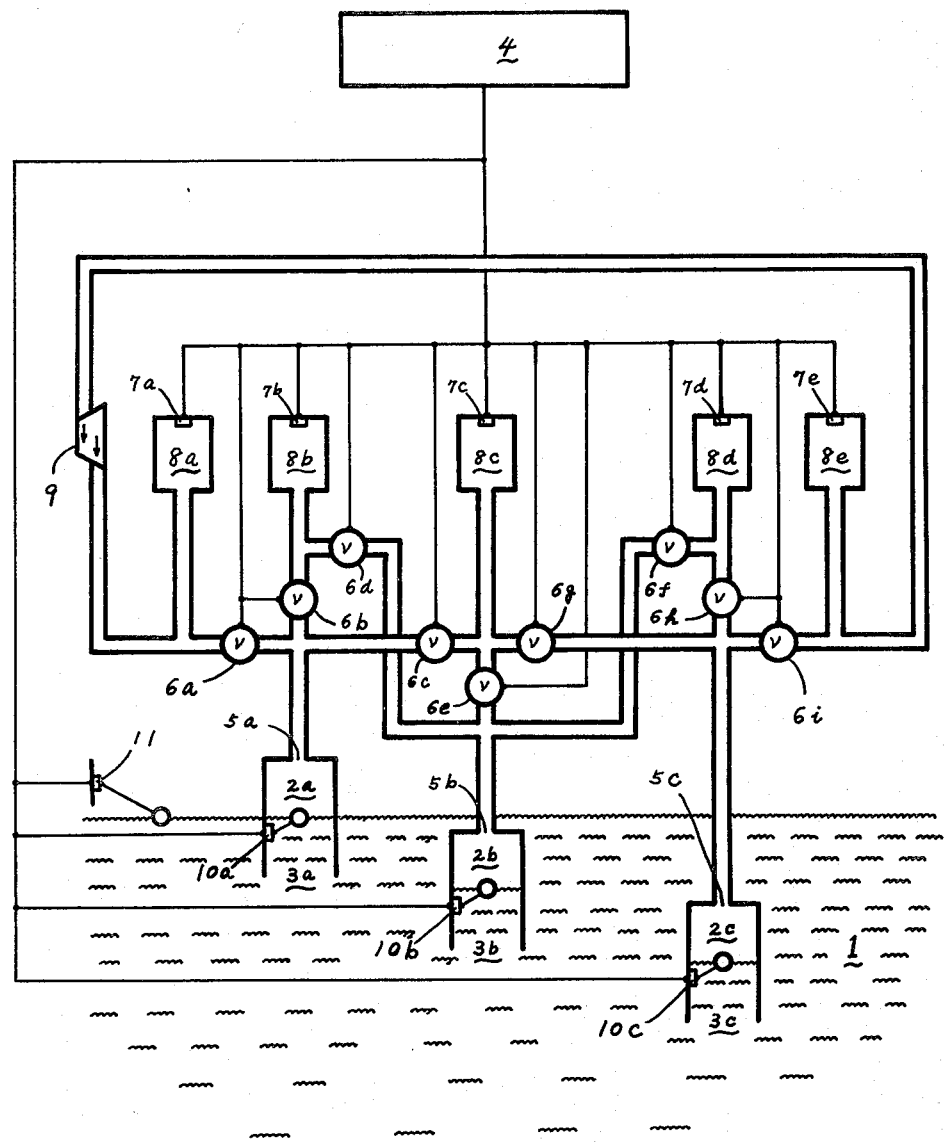
FIG. 10 shows a power generation system with manifold connections.

FIG. 10 shows a schematic diagram of a device with this improvement. The device collects energy from the wave motion of a body of water 1. A gas is used as the working fluid. There are three pumping units. Three pumping chambers, 2a, 2b, and 2c are immersed in the water. The pumping chambers have outlets 3a, 3b, 3c, and ports 5a, 5b, 5c. The chambers are connected with five accumulators 8a, 8b, 8c, 8d, 8e through a manifold. The pressures in the accumulators increase successively from 8a to 8e. Valves 6a, 6b, 6c, 6d, 6e, 6f, 6g, 6h, 6i are provided in the manifold to regulate the gas flows. The chamber 2a operates with accumulators 8a, 8b, 8c through valves 6a, 6b, 6c. The chamber 2b operates with accumulators 8b, 8c, 8d through valves 6d, 6e, 6f. The chamber 2c operates with accumulators 8c, 8d, 8e through valves 6g, 6h, 6i. The valves are controlled by a computer 4. A water level sensor 11 measures the level of the open water. Sensors 10a, 10b, 10c measure water levels inside the pumping chambers. Pressure sensors 7a, 7b, 7c, 7d, 7e measure the pressures in the accumulators. All the sensors send measured data to the computer 4. The computer computes the optimal timing for the opening and closing of the valves and sends the commands to the valves. A turbine 9 is connected between accumulators 8e and 8a to generate mechanical power.

Another improvement is possible by reducing the energy loss in the thermal cycle of the working fluid. If a gas is used as the working fluid, its thermodynamic state is determined by its temperature, pressure, and density. The temperature of the gas is raised when it is compressed. Heat may escape to the surroundings if the gas is not insulated. The degree to which the gas is insulated affects its thermodynamic state. It further affects the amount of work needed to compress the gas. When the gas expands and does work, its temperature tends to decrease. It may absorbs some heat if it is in contact with a hotter surroundings. The amount of work done by the gas depends on the amount of heat the gas absorbs. The compression and expansion of the gas form a thermodynamic cycle. For maximum thermodynamic efficiency, it is desirable to use either adiabatic cycle or isothermal cycle. In the adiabatic cycle, the gas is heat insulated from the time it is compressed till the time it has expanded and released its energy. In the isothermal cycle, the gas is kept at the same temperature as the surroundings by radiators so that it releases heat during compression and absorbs heat during expansion. Deviations from these ideal conditions can result in loss of efficiency. Depending on which cycle is chosen, the pumping device is either provided with insulations or heat exchange devices. This improvement applies to all three forms of the invention disclosed earlier.

Figure 11:
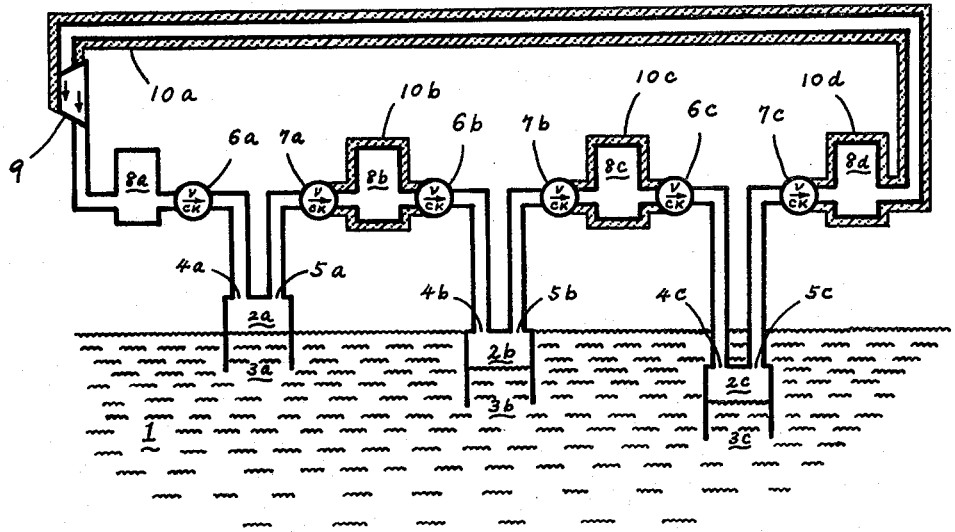
FIG. 11 shows a power generation system with insulation.

FIG. 11 illustrates the improvement with insulation. The device collects energy from the wave motion of a body of water 1. A gas is used as the working fluid. Three pumping chambers 2a, 2b, 2c have outlets 3a, 3b, 3c, intake ports 4a, 4b, 4c and exhaust ports 5a, 5b, 5c. The ports are connected to accumulators 8a, 8b, 8c, 8d through intake valves 6a, 6b, 6c and exhaust valves 7a, 7b, 7c. A turbine 9 is connected between 8d and 8a. The device is provided with heat insulators 10a, 10b, 10c, and 10d.

Figure 12:
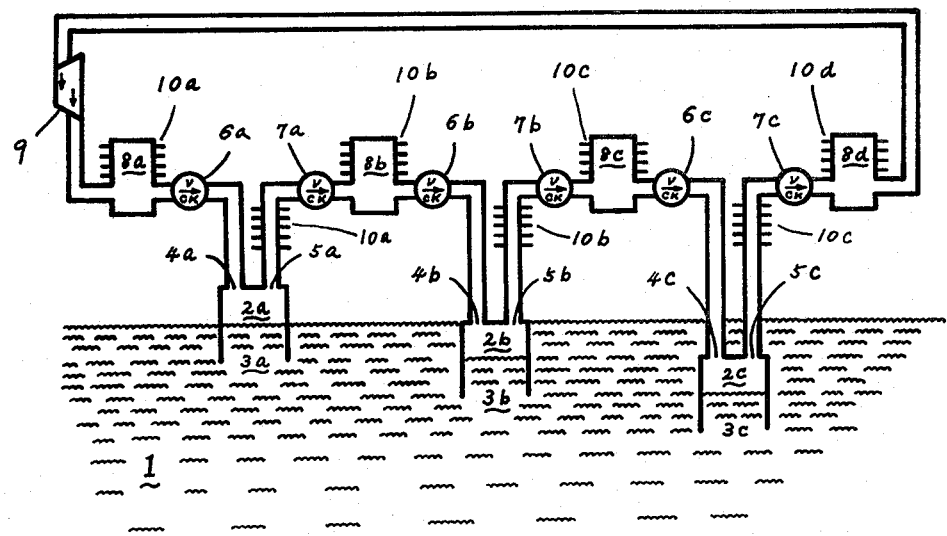
FIG. 12 shows a power generation system with heat exchange device.

FIG. 12 illustrates the improvement with heat exchange device. The device collects energy from the wave motion of a body of water 1. A gas is used as the working fluid. Three pumping chambers 2a, 2b, 2c have outlets 3a, 3b, 3c, intake ports 4a, 4b, 4c and exhaust ports 5a, 5b, 5c. The ports are connected to accumulators 8a, 8b, 8c, 8d through intake valves 6a, 6b, 6c and exhaust valves 7a, 7b, 7c. A turbine 9 is connected between 8d and 8a. The device is provided with cooling fins 10a, 10b, 10c, and 10d as heat exchange device. In addition, the turbine is provided with heat exchange device which allows the gas to absorb heat from the enviroment during expansion.

I claim:

1. An apparatus for converting ocean wave motion into useful energy comprising:
   a multi-stage compression system in which a compressible working fluid is pressurized in a plurality of stages;
   said compression system including a plurality of chambers opened at one end to the influence of said wave motion whereby said compressible working fluid in said chamber is compressed,
   each of said chambers being located at a progressively lower vertical position within said ocean,
   conduit means interconnecting each of said chambers to allow said working fluid to serially flow through each of said chambers,
   a pressure accumulator means located in each conduit connecting said chambers,
   valve means located in each conduit connecting said chambers,
   conduit means connecting the last of said chambers to a prime mover to be driven by the compressed working fluid,
   conduit means connecting the exhaust of said prime mover with the first of said chambers,
   a valve means located in each conduit connecting said prime mover,
   whereby fluid flows through the prime mover, to said compression system and back to said prime mover in a closed system.

2. An apparatus for converting ocean wave motion into useful energy comprising:
   a multi-stage pumping system in which a working fluid is forced to flow in a plurality of stages;
   said pumping system including a plurality of chambers opened at one end to the influence of said wave motion whereby said working fluid in said chamber is forced to flow,
   each of said chambers being located at a progressively higher vertical position,
   conduit means interconnecting each of said chambers to allow said working fluid to serially flow through each of said chambers,
   a fluid accumulator means located in each conduit connecting said chambers,
   valve means located in each conduit connecting said chambers,
   conduit means connecting the last of said chambers to a prime mover to be driven by the working fluid,
   conduit means connecting the exhaust of said prime mover with the first of said chambers,
   a valve means located in each conduit connecting said prime mover,
   whereby fluid flows through the prime mover, to said pumping system and back to said prime mover in a closed system.

3. An apparatus for converting ocean wave motion into useful energy comprising:
   a multi-stage compression system in which a compressible working fluid is pressurized in a plurality of stages;
   said compression system including a plurality of chambers opened at one end to the influence of said wave motion whereby said compressible working fluid in said chamber is compressed,
   each of said chambers being located at a progressively lower vertical position within said ocean,
   first pressure accumulator means,
   conduit means connecting said first pressure accumulator to the first of said chambers,
   a valve means located in said conduit connecting the first pressure accumulator and the first chamber,
   manifold means interconnecting said chambers to allow said working fluid to flow through said chambers with increasingly greater pressures,
   a pressure accumulator means located in each manifold connecting said chambers,
   valve means located in each manifold connecting said chambers,
   last pressure accumulator means, conduit means connecting the last of said chambers to said last pressure accumulator, a valve means located in said conduit connecting the last chamber and the last pressure accumulator, conduit means connecting said last pressure accumulator to a prime mover to be driven by the compressed working fluid, conduit means connecting the exhaust of said prime mover to said first pressure accumulator, whereby fluid flows through the prime mover, to said compression system and back to said prime mover in a closed system.

4. An apparatus for converting ocean wave motion into useful energy comprising:

a multi-stage pumping system in which a working fluid is forced to flow in a plurality of stages;

said pumping system including a plurality of chambers opened at one end to the influence of said wave motion whereby said working fluid in said chamber is forced to flow, each of said chambers being located at a progressively higher vertical position, first fluid accumulator means, conduit means connecting said first fluid accumulator to the first of said chambers, a valve means located in said conduit connecting the first fluid accumulator and the first chamber, manifold means interconnecting said chambers to allow said working fluid to flow through said chambers with increasingly higher vertical positions, a fluid accumulator means located in each manifold connecting said chambers, valve means located in each manifold connecting said chambers, last fluid accumulator means, conduit means connecting the last of said chambers to said last fluid accumulator, a valve means located in said conduit connecting the last chamber and the last fluid accumulator, conduit means connecting said last fluid accumulator to a prime mover to be driven by the working fluid, conduit means connecting the exhaust of said prime mover to said first fluid accumulator, whereby fluid flows through the prime mover, to said pumping system and back to said prime mover in a closed system.

* * * * *